US006629771B2

(12) United States Patent
Chiu

(10) Patent No.: US 6,629,771 B2
(45) Date of Patent: Oct. 7, 2003

(54) MODULAR LAMP UNIT FOR FLEXIBLY CONFIGURED LAMP ASSEMBLY

(76) Inventor: Hua Jung Chiu, 9F, No. 69, Sec. 1, Chung Shan Rd., Hsin Chuang City, Taipei Hsien (TW)

( * ) Notice: Subject to any disclaimer, the term of this patent is extended or adjusted under 35 U.S.C. 154(b) by 0 days.

(21) Appl. No.: 10/055,982

(22) Filed: Jan. 28, 2002

(65) Prior Publication Data

US 2003/0142499 A1 Jul. 31, 2003

(51) Int. Cl.[7] .................................................. B60Q 1/00

(52) U.S. Cl. ........................ 362/368; 362/147; 362/249; 362/252; 362/362; 362/391

(58) Field of Search ................................ 362/368, 147, 362/252, 362, 391, 249

(56) References Cited

U.S. PATENT DOCUMENTS 4,253,135 A * 2/1981 Black ......................... 362/249
4,352,151 A * 9/1982 Lewis ........................ 362/368
4,433,363 A * 2/1984 Weber ......................... 362/86
6,511,207 B2 * 1/2003 Limber et al. .............. 362/252

* cited by examiner

*Primary Examiner*—Sandra O'Shea
*Assistant Examiner*—James W Cranson, Jr.
(74) *Attorney, Agent, or Firm*—Rosenberg, Klein & Lee

(57) ABSTRACT

A lamp assembly formed by at least one lamp unit is provided. Each lamp unit includes an outer frame having four corners, a middle frame, and an inner frame enclosing a lamp. The outer frame includes conductive blocks disposed at each corner, with the conductive blocks at diagonally opposed corners forming an electrode electrically connected to the lamp. The middle frame includes two outer shafts and two inner shafts pivotally connected, respectively, to the outer frame and inner frame. Each conductive block has formed therein at least one threaded hole corresponding with a hole formed in the outer frame. Adjacent lamp units in a lamp assembly are connected by a connection unit to be arranged in various stacked or hanging configurations.

9 Claims, 10 Drawing Sheets

MODULAR LAMP UNIT FOR FLEXIBLY CONFIGURED LAMP ASSEMBLY

FIELD OF THE INVENTION

The present invention relates to a lamp assembly, more specifically to a lamp assembly comprising at least one lamp unit, which can be individually used or assembly with one or more others for use.

BACKGROUND OF THE INVENTION

Conventional lamps such as ceiling lamps, wall lamps, and desktop lamps are generally used individually and not in a combined configuration. A plurality of lamps may be strung together by a conductive cord to form a lamp string for projection lamps or decorative lamps. However, this type of lamp string is hard to fix and configure for decorative effect.

FIG. 1 shows a hanging lamp 1*a* with a fixing post 1*b* to fix the hanging lamp 1*a* to a ceiling. This type of hanging lamp 1*a* may be connected in series, but lacks flexibility.

SUMMARY OF THE INVENTION

It is an object of the present invention to provide a lamp assembly comprising at least one lamp unit, wherein individual lamp units may be mounted on a plane for use, and multiple lamp units may be connected by a connection unit for use in wall-mounting or hanging configuration. The lamp unit has a pivotal unit to adjust light emission direction.

It is another object of the present invention to provide a lamp assembly comprising at least one lamp unit, wherein each lamp unit has conductive blocks, and the lamp units may be arranged such that the opposing conductive blocks of two adjacent lamp units have the same polarity. The lamp units can be connected through a connection unit and modularly arranged. Therefore, the lamp units may be placed in a planar or a three-dimensional arrangement for decorative effect.

To achieve these and other objects, the present invention provides a lamp assembly having at least one lamp unit. Each lamp unit comprises an outer frame with four corners, a middle frame and an inner frame enclosing a lamp. The outer frame has conductive blocks at each corner, and the conductive blocks at diagonal corners form an electrode electrically connected to the lamp. The middle frame has two outer shafts and two inner shafts, wherein the outer shafts are pivotally connected to an inner side of the outer frame, and the inner shafts are pivotally connected to corresponding sides of the inner frame. Each conductive block has at least one threaded hole, and the outer frame has a hole corresponding to the threaded hole. Adjacent lamp units may be connected through a connection unit and arranged in stacked or hanging configuration.

BRIEF DESCRIPTION OF THE DRAWINGS

The various objects and advantages of the present invention will be more readily understood from the following detailed description when read in conjunction with the appended drawings, in which.

DETAILED DESCRIPTION OF THE PREFERRED EMBODIMENTS

Figure 1:
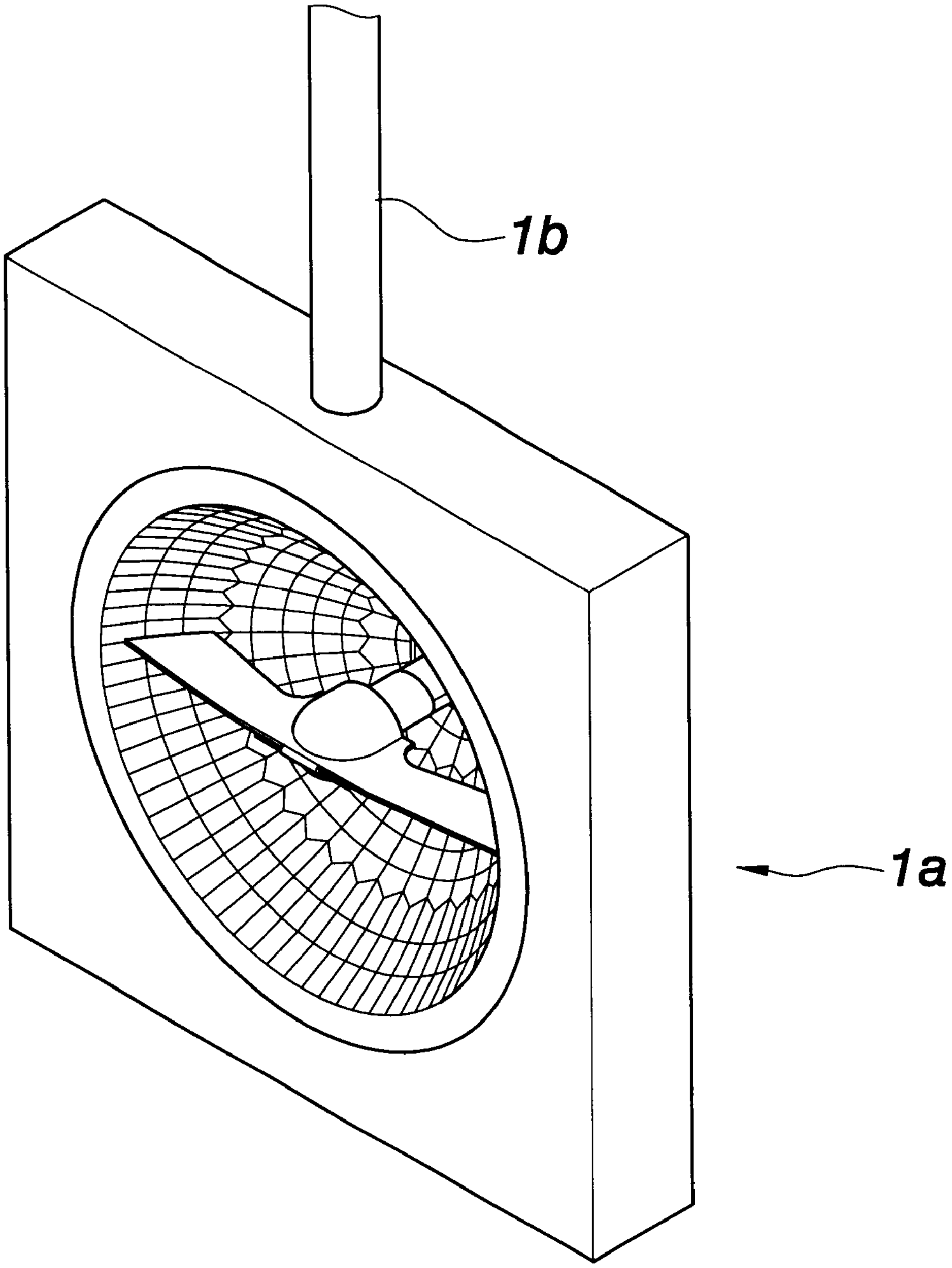
FIG. 1 PRIOR ART
FIG. 1 shows a perspective view of a prior art lamp.
Figure 2:
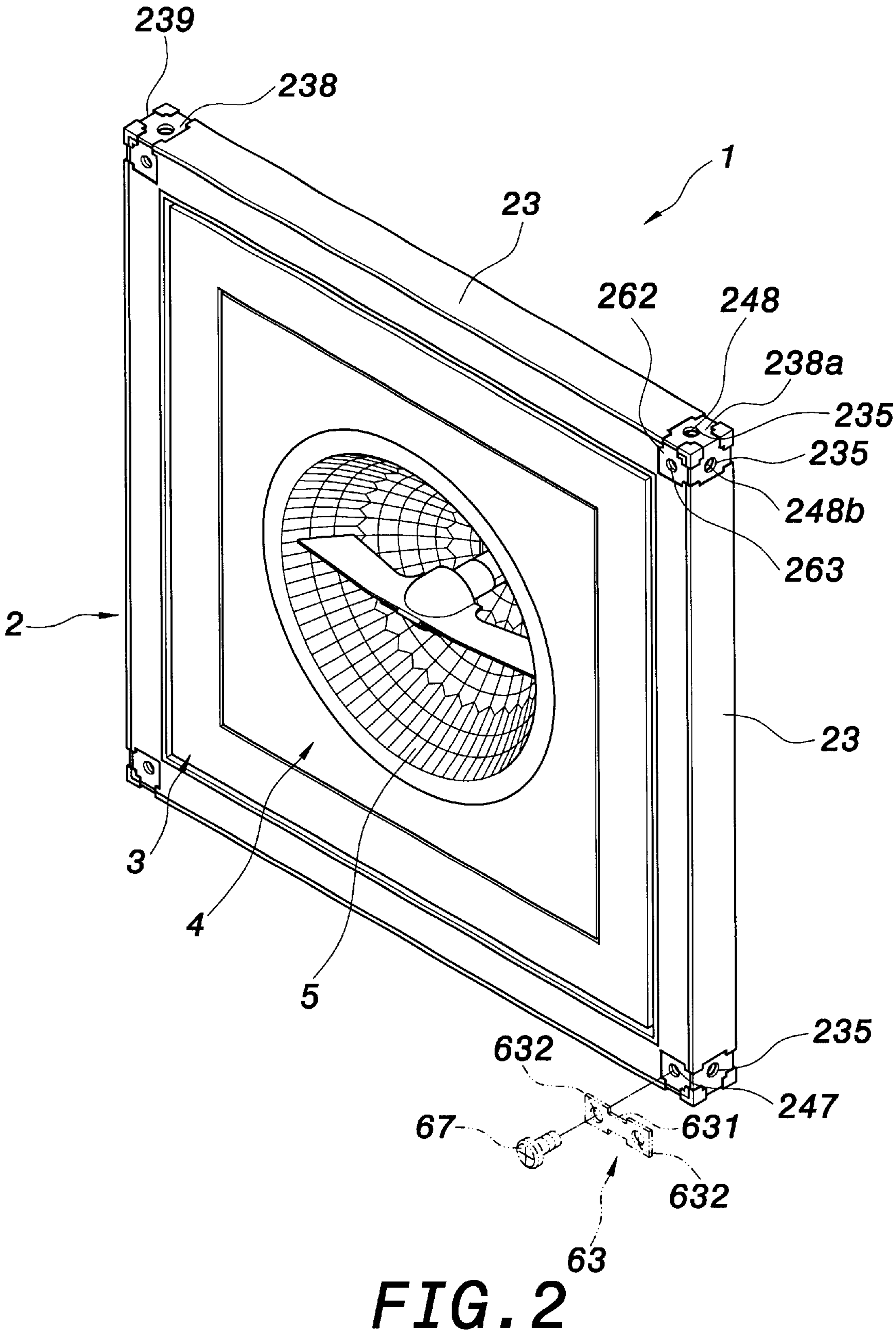
FIG. 2 shows a perspective view of a lamp unit of the present invention.
Figure 3:
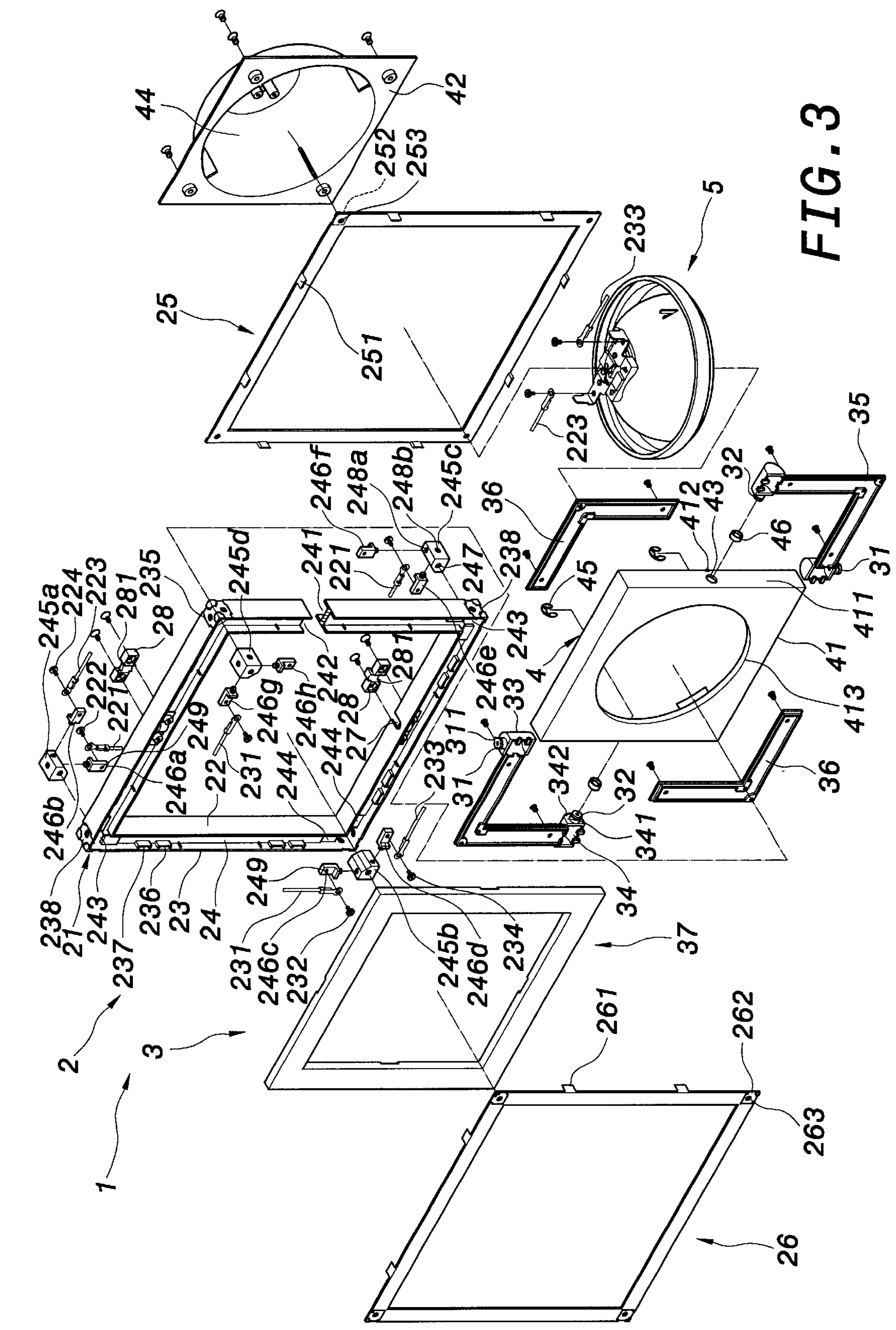
FIG. 3 shows an exploded view of the lamp unit of the present invention.

With reference to FIGS. 2 and 3, the present invention provides a lamp assembly. The lamp assembly comprises at least one lamp unit 1 having an outer frame 2 of rectangular or other shape. The outer frame 2 shown in these figures is a square shape with four corners, wherein each pair of diagonally opposed corners is connected by either an inner lead 221 or an outer lead 231 to form an electrode. The outer frame 2 has a body 21 with four sides of generally rectangular strip shape. The frame 2 includes an inner case 22, an outer case 23, a baffle 24, an outer sash 25, and an inner sash 26.

The inner case 22 and the outer case 23 are partitioned by the baffle 24 into an inner half 241 and an outer half 242. The baffle 24 has a through groove 243 formed at each corner thereof and two clamping grooves 244 formed on both sides of the through groove 243, through which two wings 246 of a conductive block 245 are inserted. The conductive block 245 strides the inner half 241 and the outer half 242, and has a through threaded hole 247 formed therein.

In FIG. 3, the four conductive blocks 245 are labeled 245*a*, 245*b*, 245*c*, and 245*d* in counterclockwise order. Each conductive block 245 has two outer sides abutting the edge of the outer case 23, and two outer sides thereof have two threaded holes 248*a* and 248*b* respectively formed therein to communicate with the through threaded hole 247.

The outer case 23 has two through holes 235 corresponding to the two threaded holes 248*a* and 248*b*. The through hole 235 is disposed in proximity to a lateral groove 238 having a shrunk mouth 239 at an edge thereof.

Each of the wings 246 has a set threaded hole 249. Two wings 246*a* and 246*b* are provided for the conductive block 245*a*; two wings 246*c* and 246*d* are provided for the conductive block 245*b*; two wings 246*e* and 246*f* are provided for the conductive block 245*c*; and, two wings 246*g* and 246*h* are provided for the conductive block 245*d*. The wings of the conductive blocks 245*a* and 245*c* are located in the inner half 241, and the wings of the conductive blocks 245*b* and 245*d* are located in the outer half 242.

The wing 246*a* of the conductive block 245*a* is fixed at one end of the inner lead 221 of the inner half 241 by screwing a set screw 222 to the set threaded hole 249, while the wing 246*c* of the conductive block 245*b* is fixed at one end of the outer lead 231 of the outer half 242 by screwing a set screw 232 to the set threaded hole 249. The other end of the inner lead 221 is connected to the wing 246*e* of the conductive block 245*c* diagonally offset from the conductive block 245*a*; and, the other end of the outer lead 231 is connected to the wing 246*g* of the conductive block 245*d* diagonally offset from the conductive block 245*b*. The other wing 246*b* of the conductive block 245*a* is fixed at one end of an inner lamp lead 223 by screwing a set screw 224 to the set threaded hole 249. The other wing 246*d* of the conductive block 245*b* is fixed at one end of an outer lamp lead 233 by screwing a set screw 234 to the set threaded hole 249. The other end of each of the inner lamp 223 and the outer lamp lead 233 passes through an outer shaft 31 of a middle frame 3, through an inner space of the middle frame 3, and enters an inner frame 4 through an inner shaft 32 of the middle frame 3. This other end of each of the inner lamp lead 223 and the outer lamp lead 233 is connected to a corresponding electrode of a lamp 5 such that the leads in the inner half 241 form one electrode set and he leads in the outer half 242 form another electrode set.

The outer sash 25 and the inner sash 26 are assembled to an inner opening and an outer opening of the outer frame 2 and retained by inserting inner inserts 251 and outer inserts 261, respectively, into corresponding clamping grooves 236 and 237. The outer sash 25 and the inner sash 26 have formed therein holes 253 and 263 corresponding to both sides of the through threaded hole 247, and concave dents 252 and 262.

The outer frame 2 has pivotally connected at two sides of the inner case 22 two outer shafts 31 disposed at two outer sides of the middle frame 3. The two sides of the inner case 22 have pivotal grooves 27 corresponding to the outer shafts 31, such that the outer shafts 31 are inserted into the pivotal grooves 27 through the inner half 241. A pivotal cover 28 is disposed about an upper half of the outer shaft 31, and both sides of the pivotal cover 28 are screwed to the baffle 24. The outer shaft 31 has a first swelling 33 connected to a second swelling 34 of an inner shaft 32 through an angle plate 35. The inner shafts 32 on the inner sides of the middle frame 3 are pivotally inserted into holes 43 formed on the inner frame 4 and are retained by corresponding caps 46 and retainers 45.

Figure 4:
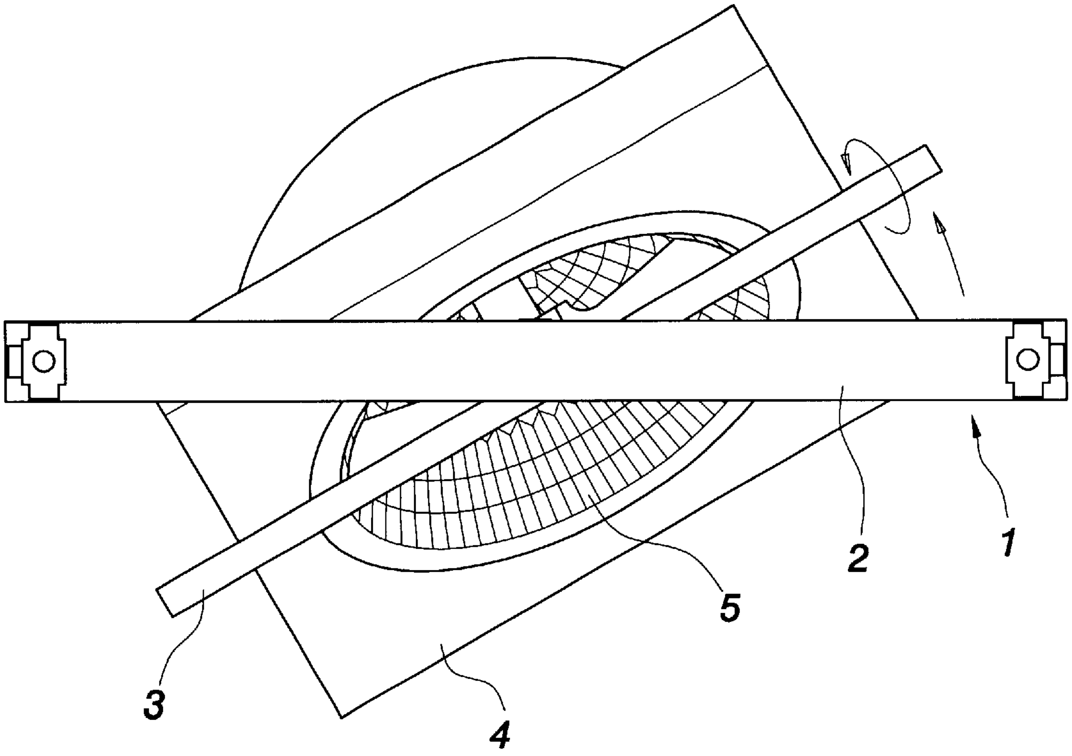
FIG. 4 shows a top view of the lamp unit of the present invention.

The inner frame 4 is thereby pivotally connected to the middle frame 3 and has a 45-degree roll relative to the middle frame 3, as shown in FIG. 4. In addition, the inner frame 4 has a bump 412 formed on an outer side 411 thereof engaging an embowed groove 342 formed on an inner surface 341 of the second swelling 34. As shown in FIG. 4, the middle frame 3 is also pivotally connected to the outer frame 2, with a 45-degree swing relative to the outer frame 2. Moreover, the outer shaft 31 has an outer bump 311 moved between two clamping bumps 281 formed on the pivotal cover 28.

The lamp 5 is placed in the inner frame 4 and has two electrodes connected to the lamp leads 223 and 233, respectively. The middle frame 3 has a middle sash 37. Angle plates 35 having inner shafts 31 and outer shafts 32 are locked to a rear surface of the middle sash 37 with the angle plates 36.

The inner frame 4 comprises an inner panel 41 and an outer panel 42 locked to each other. The inner panel 41 is formed with holes 43, and the outer panel 42 defines a bowl 44 inwardly concaved to receive a shade of the lamp 5. The inner panel 41 defines a central aperture 413 through which light from the lamp 5 passes.

Figure 5:
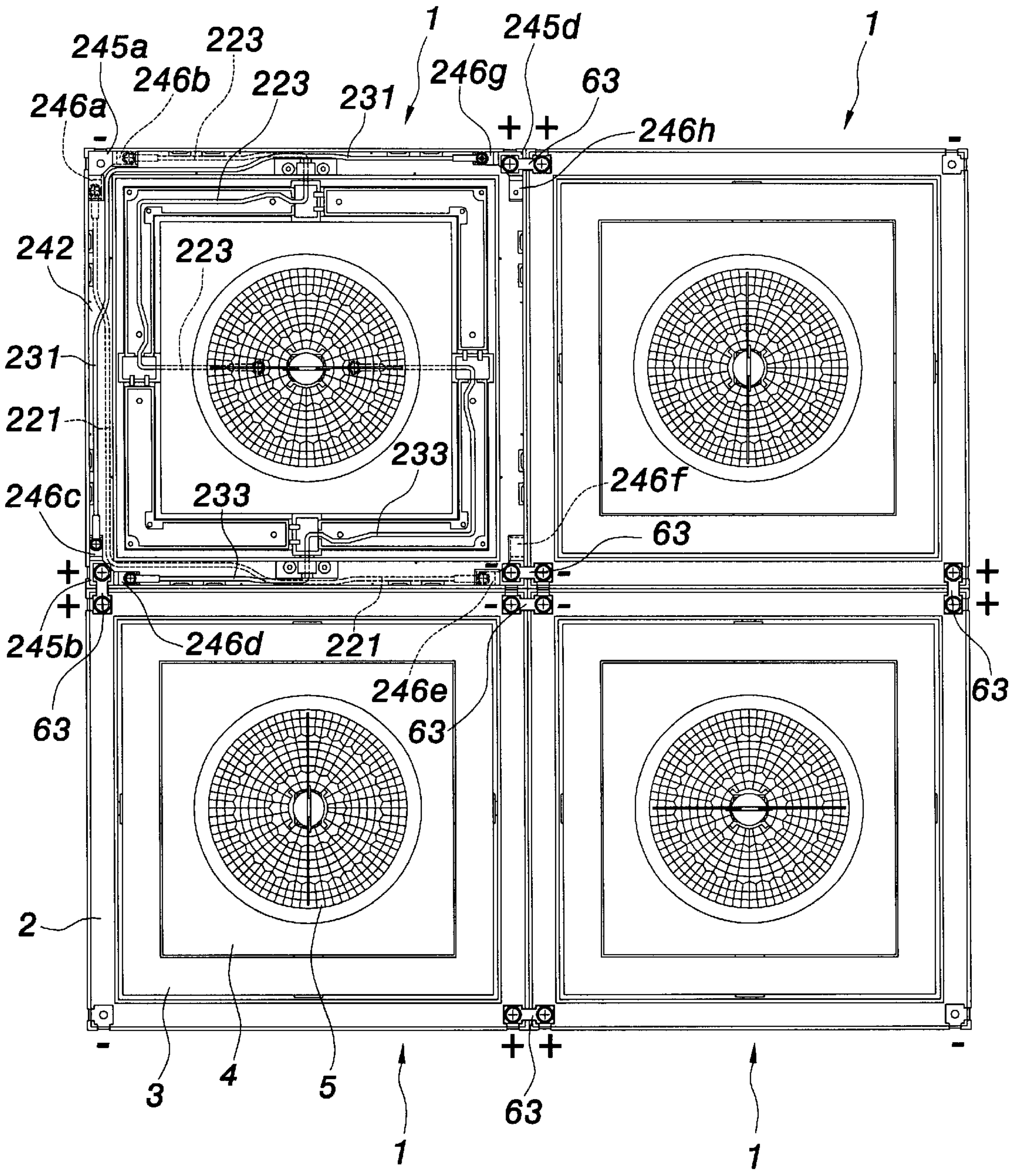
FIG. 5 shows an electrode arrangement for a lamp assembly of the present invention.

FIG. 5 shows an electrode arrangement for the inventive lamp assembly comprising a plurality of lamp units 1. Two corners of each lamp unit 1 diagonal to each other function as an anode, while the other two corners of each lamp unit 1 diagonal to each other function as a cathode. The plurality of lamp units 1 are arranged such that adjacent corners of neighboring lamp units 1 are of the same polarity. Therefore, two wires can be connected to corresponding anodes and cathodes on the lamp units 1 to provide electric power to the entire lamp assembly.

Figure 6:
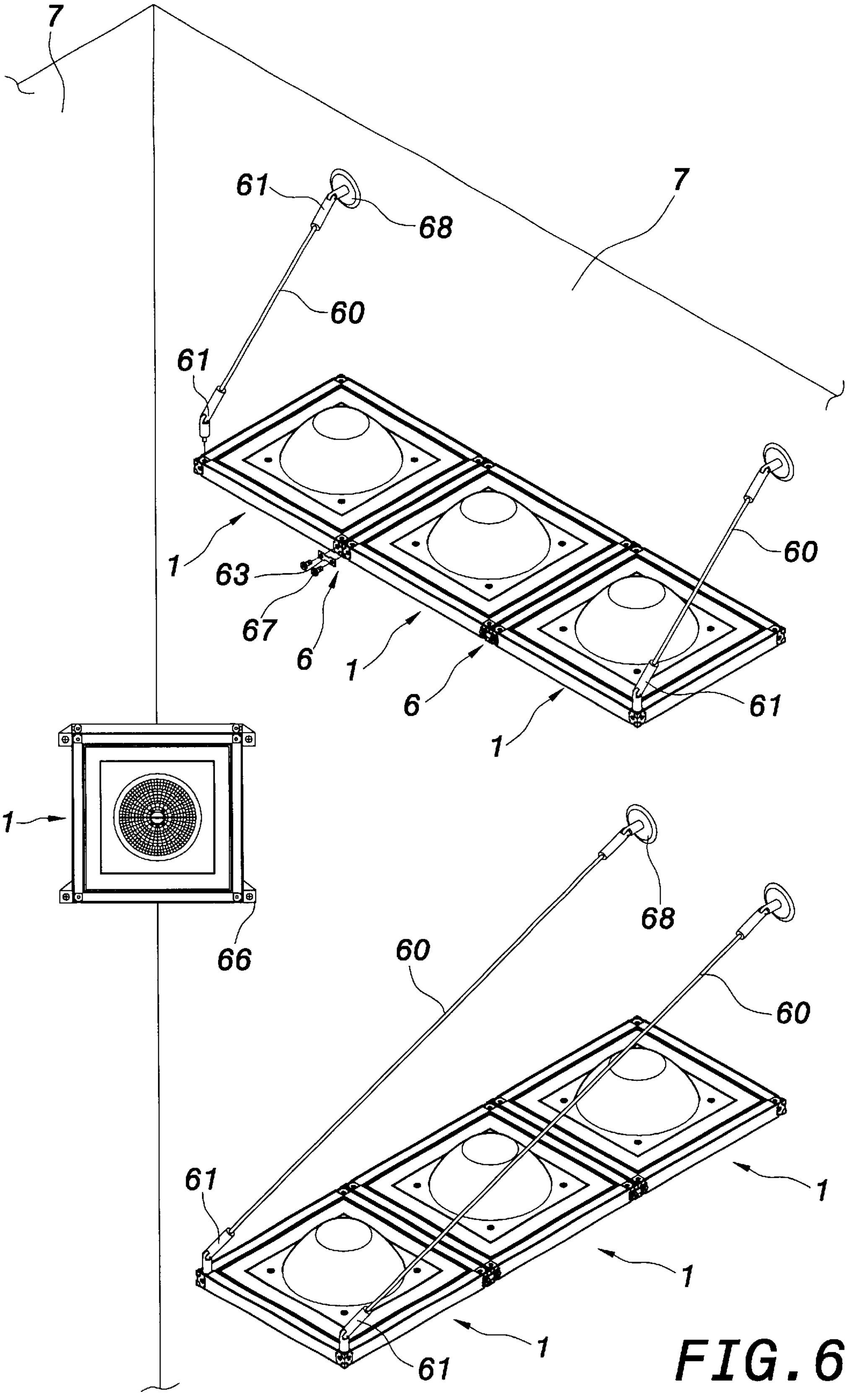
FIG. 6 shows a perspective view of various configurations by which a lamp assembly or a lamp unit thereof is hung horizontally or mounted on a wall.
Figure 7:
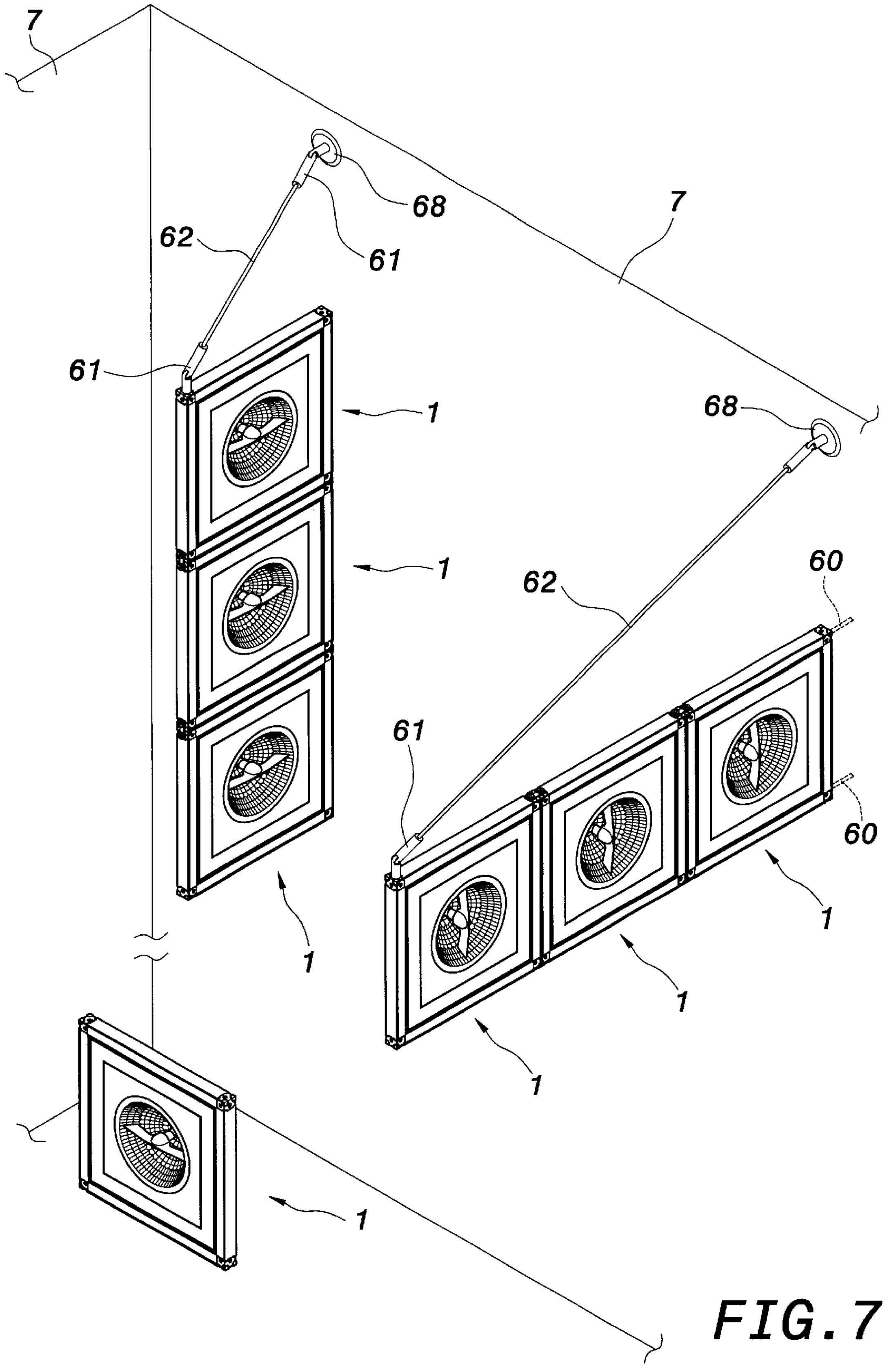
FIG. 7 shows a perspective view of various configurations by which a lamp assembly or a lamp unit thereof is hung vertically or placed upon a surface.
Figure 8:
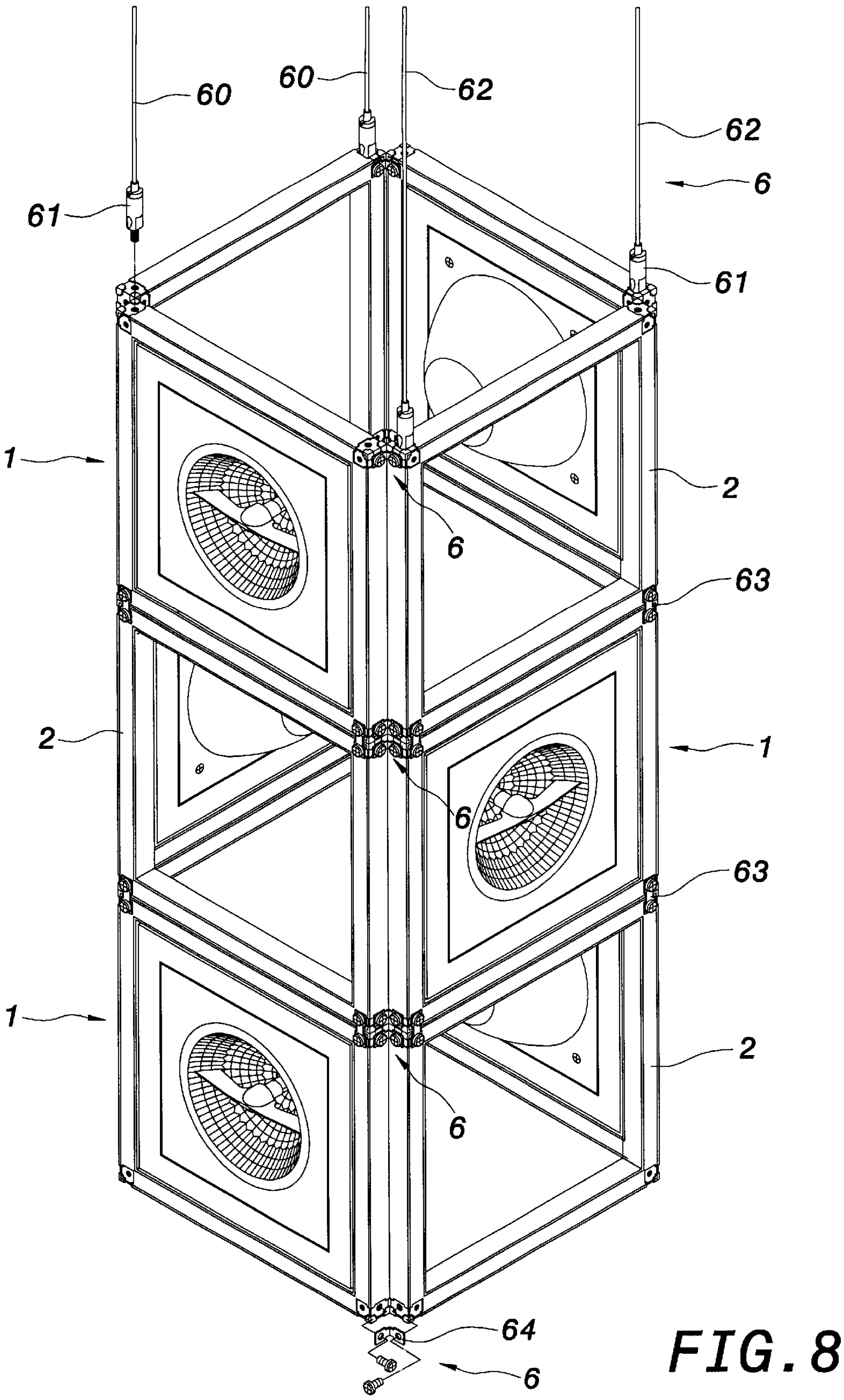
FIG. 8 shows a perspective view of a plurality of the lamp units assembled into a rectangular post configuration.

As shown in FIGS. 6 and 7, the lamp units 1 are assembled in a hanging lamp assembly, or in a stacked lamp assembly. In the hanging lamp assembly, the lamp assembly is hung by two conductive wires 60 through two connectors 61, wherein the lamp units 1 are arranged in flat co-planar manner as shown in FIG. 6, or in erect coplanar manner as shown in FIG. 7. Depending on the arrangement, the lamp units 1 may be in horizontal or vertical orientation, and in an arrayed configuration. Adjacent lamp units 1 are secured together by a connection unit 6. As shown in FIG. 8, moreover, the hanging lamp assembly may be supported by four wires, wherein two extra wires 62 (in addition to the wires 60) are used for secure balance.

FIG. 7 shows the case wherein the hanging lamp assembly is supported by a single wire 62, m with two conductive wires 60 being connected to a lateral side of the lamp unit(s) 1 and secured to a wall 7. Each of the wires 62 and the conductive wires 60 may be connected to a wall retainer 68 through a connector 61, with the connector 61 for each conductive wire 60 also being conductive and the connector 61 for each wire 62 being insulating.

Figure 9:
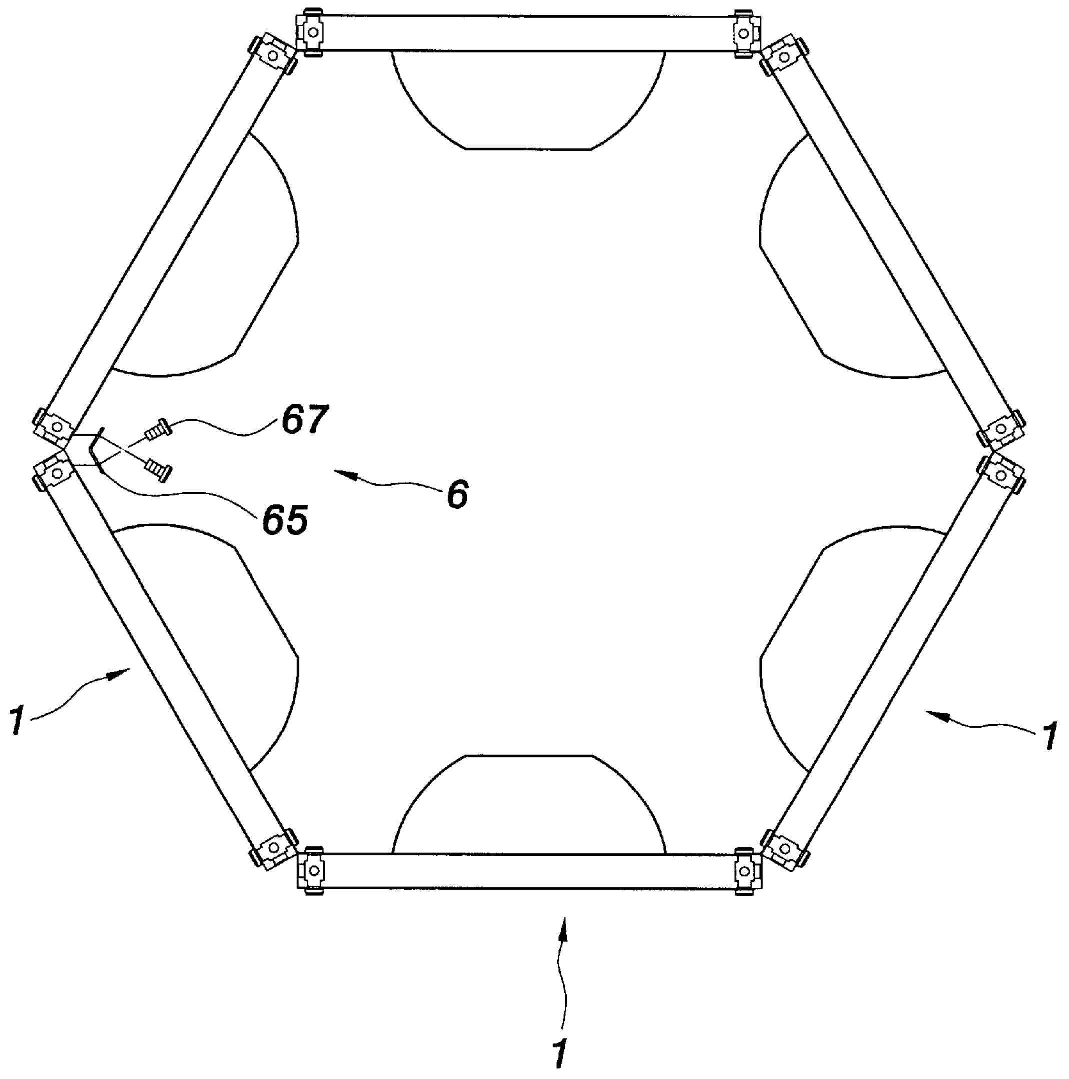
FIG. 9 shows a to p view of a plurality of the lamp units assembled into a hexagonal post configuration; and, FIG. 10 shows a top view of the lamp unit of the present invention mounted at a comer formed by two walls.
Figure 10:
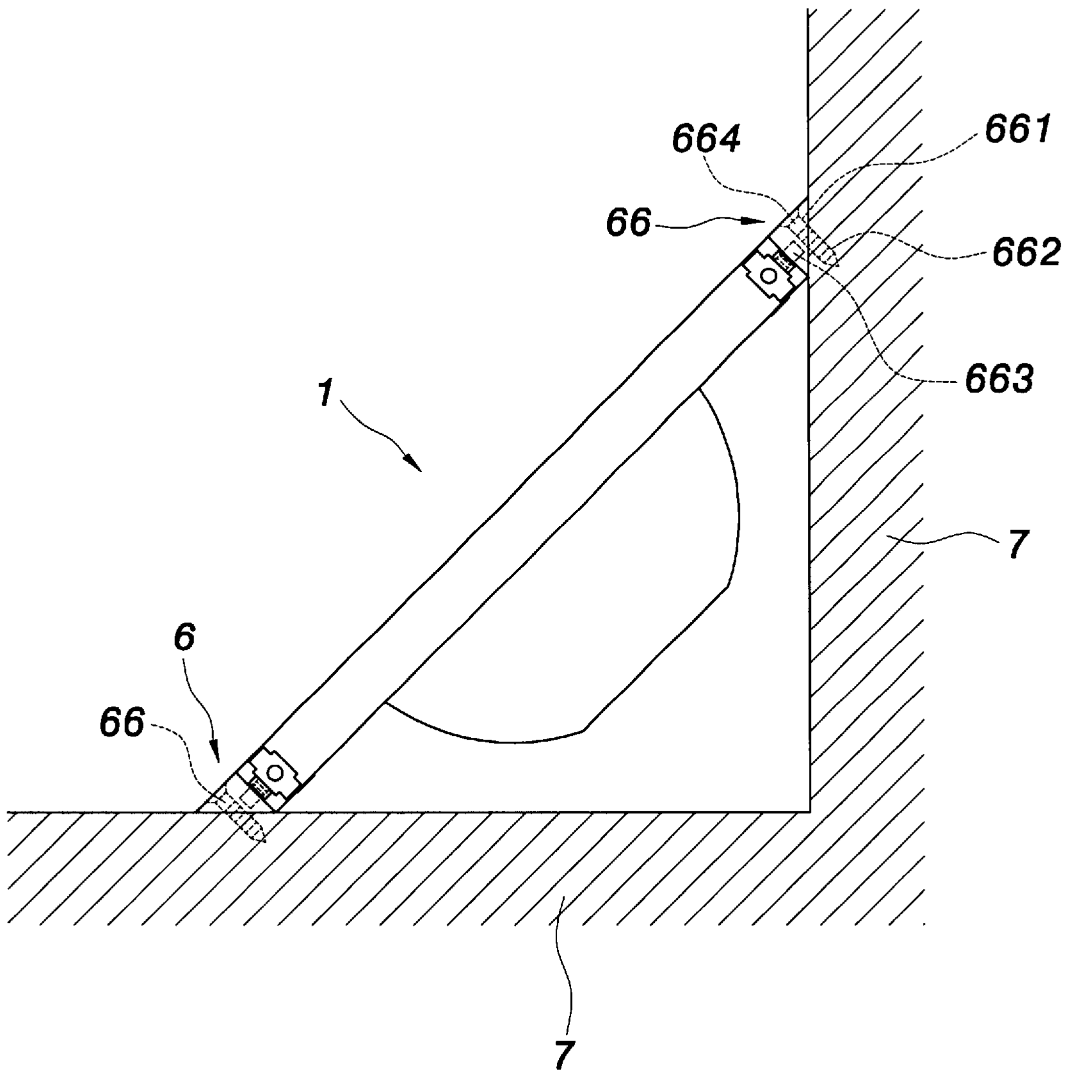

The connection unit 6, as shown in FIGS. 5 to 10, may comprise a straight connection plate 63 (as shown in FIGS. 5 to 8), an angle connection plate 64 (as shown in FIG. 8), and/or a hexagonal connection plate 65 (as shown in FIG. 9). In addition to a straight conductive connector, and the link conductive connector 61 shown in FIGS. 6 and 7, the connection unit 6 may also include a triangular pad 66 (as shown in FIG. 10) and a wall retainer 68, where a lamp unit 1 is to firmly and directly mounted to a wall.

The lamp units 1 can also be arranged in stacked manner. In that arrangement, both ends of the straight connection plate 63 are clamped to the lateral groove 238, the inner groove 252, or the external groove 262 of the outer frame 2, and then affixed. As shown in FIG. 2, such straight connection plate 63 may be formed with a narrow neck 631 at a center thereof to form two swollen ends, with each swollen end having a through hole 632. A screw 67 passes through the through hole 632 and the hole 235, the hole 253, or the hole 263 on the groove to be connected. Afterward, the screw 67 is screwed into the threaded hole 248 or the through threaded hole 247. One end of the straight connection plate 63 is thereby clamped to one lamp unit 1, and the other end of the straight connection plate 63 is clamped to an adjacent lamp unit 1. The lamp units 1 are thus assembled laterally or longitudinally as shown in FIGS. 5 to 8.

The angle connection plate 64 and the hexagonal connection plate 65 have structures similar to that of the straight connection plate 63, but with different shape, and are used at junctions between lamp units in a rectangular lamp assembly as shown in FIG. 8, and at junctions between lamp units in a hexagonal lamp assembly as shown in FIG. 9. Adjacent lamp units 1 in the rectangular lamp assembly may also connected by an outer frame 2.

Additionally, the lamp assembly may be placed at a corner as shown in FIGS. 6 and 10. The lamp unit 1 in that arrangement may employ triangular pads 66 on both sides thereof. Such triangular pads 66 are each formed with a through hole 661 passing through lateral and hypotenuse sides thereof for alignment with a clamping hole 662 adjacent to the through hole 235. A connection section 663 is disposed between the through hole 661 and the clamping hole 662, and a retainer 664 engages the wall via the through hole 661. The triangular pads 66 can shield both sides of the lamp unit 1 when it is corner-mounted against the wall 7.

To sum up, the lamp assembly according to the present invention uses three frames to provide swing and roll lamp movements and uses connection units to provide mechanical and electrical interconnection between the lamp units. The lamp units can be flexibly assembled to lamp assemblies of various geometric configurations.

Although the present invention has been described with reference to preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A lamp assembly, comprising a lamp unit comprising an outer frame, a middle frame and an inner frame, the inner frame enclosing a lamp and allowing emission of light from the lamp, the outer frame having four corners and a conductive block at each corner, the conductive blocks at diagonal corners forming an electrode electrically connected to the lamp, the middle frame having two outer shafts collinearly arranged on two outer sides thereof and two inner shafts collinearly arranged on two inner sides thereof, wherein the outer shafts are pivotally connected to inner side of the outer frame and the inner shafts are pivotally connected to corresponding sides of the inner frame, the conductive block having at least one threaded hole and the outer frame having a hole corresponding to the threaded hole.

2. The lamp assembly as in claim 1, wherein the outer frame is composed of an inner case, an outer case, a baffle, an outer sash, an inner sash, four conductive blocks, two conductive leads, two lamp leads, the baffle placed between the case frame and the outer case, the outer sash covering on an opening of the outer case and the inner sash covering on an opening of the inner case, each of the conductive leads connecting between two conductive blocks on two diagonal corner of the outer frame and placed on each side of the baffle, one of the lamp leads connected to a conductive block and passing through the outer shaft and the inner shaft of the middle frame and then connected to an electrode on the lamp, the conductive blocks striding the baffle and having two through hole on two outer sides thereof, the outer sash and the inner sash having holes on each corner thereof.

3. The lamp assembly as in claim 1, further comprising a connection unit.

4. The lamp assembly as in claim 3, wherein the connection unit comprises two conductive connectors, each of the conductive connectors connected to the threaded hole of the conductive block through a conductive wire.

5. The lamp assembly as in claim 3, wherein the connection unit comprises at least one connector connected to the threaded hole of the conductive block through a wire.

6. The lamp assembly as in claim 3, wherein the connection unit is a connection plate with one end connected to the threaded hole of the conductive block.

7. The lamp assembly as in claim 6, wherein the connection plate has another end connected to the threaded hole of adjacent conductive block of another lamp unit.

8. The lamp assembly as in claim 6, wherein the connection plate is one of the straight shape, angled shape and 120-degree banding shape.

9. The lamp assembly as in claim 3, wherein the connection unit is a triangular pad with a hypotenuse and two lateral sides, a through hole passing through the hypotenuse and one lateral side, a clamping hole passing through another lateral side, a connection section connecting the through hole with the clamping hole, a retainer retained on a wall through the through hole; whereby the triangular pad shielding distal side of the lamp unit.

* * * * *